(No Model.)

W. STRAIT.
HARROW.

No. 580,433. Patented Apr. 13, 1897.

Witnesses
Albert B. Blackwood
Jas H. Blackwood

Inventor
William Strait,
by Fenelon B. Brock
Attorney

UNITED STATES PATENT OFFICE.

WILLIAM STRAIT, OF ELMIRA, NEW YORK.

HARROW.

SPECIFICATION forming part of Letters Patent No. 580,433, dated April 13, 1897.

Application filed November 13, 1895. Serial No. 568,778. (No model.)

*To all whom it may concern:*

Be it known that I, WILLIAM STRAIT, a citizen of the United States, residing at Elmira, in the county of Chemung and State of New York, have invented certain new and useful Improvements in Harrows; and I do declare the following to be a full, clear, and exact description of the invention, such as will enable others skilled in the art to which it appertains to make and use the same, reference being had to the figures of reference marked on the accompanying drawings, which form a part of this specification.

My invention relates to eveners for harrows. Its object is to provide means for shifting the draft to one side to compensate for the sidewise drag of the implement when used on a hill.

Figure 1:
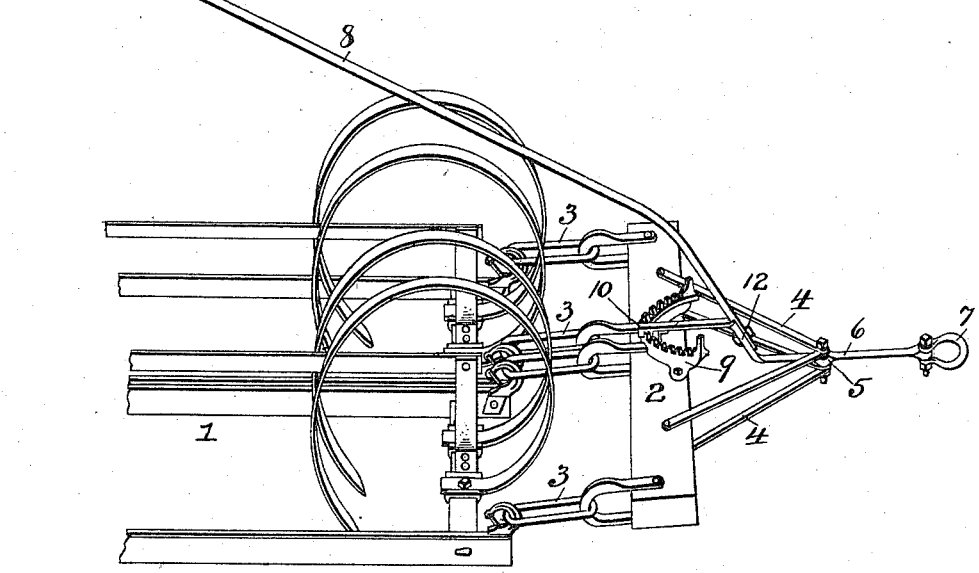
Figure 2:
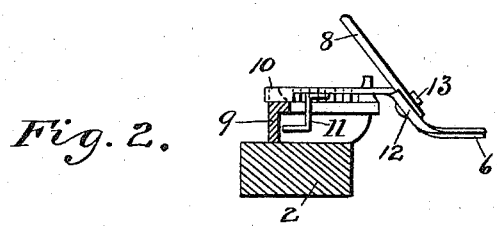

Referring to the drawings, Figure 1 is a perspective view. Fig. 2 is a detached side elevation and section showing some of the details in section.

In the several views in my drawings, 1 represents a harrow to which is attached a draw-bar 2 by links 3. Connected to the draw-bar and extending forward are links 4 4, which converge and meet at 5, where they are bolted together. On this bolt is pivoted a lever 6. At the forward end 7 of the lever 6 is swiveled the whiffletree. At its rear end the lever is preferably bent upward and has a handle 8, perferably of pipe, secured to it that extends over the rear part of the harrow.

A curved notched segment 9 is secured to the draw-bar 2 under the lever 6. This lever has a lug 10, adapted to enter a notch in the segment 9. When the lever 6 is raised, the lug is lifted out of the notch, and the lever can then be oscillated on the pivot at 5 to the right or left. When lowered, the lug will enter another notch and secure the lever in that position. A detent 11 prevents the bar being raised farther than to allow the lug to clear the notch in the segment. This movement of the lever 6 on its pivot will cause the draft connection to be shifted relatively to the draw-bar, and thus the harrow will tend to draw sidewise and adjust itself to the incline of the ground.

It will be understood that when the harrow reaches the side of the field and is reversed to return the lever will be shifted to a corresponding notch in the segment on the other side of the harrow, the tendency to trail being thus transferred from one side to the other as the implement is reversed.

The lever 6 is curved or otherwise shaped at 12 in order to fit the form of the handle 8, whereby the use of a single bolt 13 will rigidly secure the parts against displacement and the lever 6 strengthened.

I claim—

1. In a draft evener or regulator, the combination with a draw-bar and means detachably securing the same to the harrow or other frame, of a draft-lever pivotally supported upon the bar, and mechanism for adjusting the position of the draft-lever also carried by the draw-bar, substantially as described.

2. In a draft evener or regulator, the combination of a draw-bar detachably secured to the harrow or other frame, a draft-lever pivotally supported by the draw-bar, a curved, notched segment also carried by the draw-bar, a lug on the lever adapted to enter the notches in said segment and means for adjusting said lug on the segment, substantially as described.

3. In a draft evener or regulator, a draw-bar detachably secured to the harrow or other frame, a draft-lever pivoted on converging links supported by said draw-bar, a curved, notched segment carried by the draw-bar, a lug on the draft-lever entering the notches in said segment, a handle attached to the draft-lever, and a detent limiting the throw of the draft-lever in the act of adjustment, substantially as described.

In testimony whereof I affix my signature in the presence of two witnesses.

WILLIAM STRAIT.

Witnesses:
G. A. YOUNG,
C. E. GRAHAM.